(12) United States Patent
Stepanov et al.

(10) Patent No.: US 9,684,440 B2
(45) Date of Patent: Jun. 20, 2017

(54) PROGRESSIVE ROTATIONAL VIEW

(71) Applicant: APPLE INC., Cupertino, CA (US)

(72) Inventors: Maxim V. Stepanov, Cupertino, CA (US); Christian E. Porter, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 152 days.

(21) Appl. No.: 14/319,892

(22) Filed: Jun. 30, 2014

(65) Prior Publication Data

US 2015/0379690 A1  Dec. 31, 2015

(51) Int. Cl.
*G06F 3/048* (2013.01)
*G06F 3/0485* (2013.01)
*G06F 3/0484* (2013.01)
*G06F 3/0488* (2013.01)
*G09G 5/00* (2006.01)
*G06T 15/20* (2011.01)
*G06F 3/14* (2006.01)
*G06Q 30/06* (2012.01)

(52) U.S. Cl.
CPC ........ *G06F 3/0485* (2013.01); *G06F 3/04845* (2013.01); *G06F 3/04883* (2013.01); *G09G 5/00* (2013.01); *G06F 3/14* (2013.01); *G06Q 30/0643* (2013.01); *G06T 15/205* (2013.01); *G06T 2200/24* (2013.01); *G09G 2340/14* (2013.01); *G09G 2350/00* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 6,525,732 B1 * | 2/2003 | Gadh | G06T 15/20 345/428 |
| 6,754,400 B2 | 6/2004 | Florin et al. | |
| 6,795,113 B1 | 9/2004 | Jackson et al. | |
| 7,460,130 B2 * | 12/2008 | Salganicoff | A61B 5/14532 345/561 |
| 7,512,902 B2 | 3/2009 | Robertson et al. | |
| 8,584,047 B2 | 11/2013 | Athans et al. | |
| 2002/0060692 A1 * | 5/2002 | Broemmelsiek | G06F 3/012 345/649 |
| 2003/0137506 A1 * | 7/2003 | Efran | G06T 9/00 345/419 |
| 2005/0195157 A1 * | 9/2005 | Kramer | G06F 3/04845 345/156 |
| 2005/0198571 A1 * | 9/2005 | Kramer | G06F 3/04845 715/236 |

(Continued)

*Primary Examiner* — Ryan D McCulley
(74) *Attorney, Agent, or Firm* — Blank Rome LLP

(57) ABSTRACT

Systems and methods for receiving and displaying images or sending the images for display include images having multiple key images of an object. Each key image depicts a perspective view of an item from a different angle around the object. The multiple key images are displayed in a gallery view. During the gallery view, multiple supplementary images are received or sent. Each supplementary image includes a perspective view of the object from an angle between adjacent angles used for the key images. After transmission of at least some of the supplementary images, the key images and the supplementary images are mixed into a rotational view of the object.

23 Claims, 11 Drawing Sheets

(56) References Cited

U.S. PATENT DOCUMENTS

| | | | |
|---|---|---|---|
| 2009/0055289 A1* | 2/2009 | Harris | G06F 17/3089 |
| | | | 705/27.2 |
| 2009/0284585 A1* | 11/2009 | Tsai | H04N 1/00129 |
| | | | 348/48 |
| 2010/0284605 A1* | 11/2010 | Rau | G06T 15/205 |
| | | | 382/154 |
| 2011/0126156 A1 | 5/2011 | Krishnaraj et al. | |
| 2012/0259738 A1* | 10/2012 | Pillai | G06T 17/00 |
| | | | 705/26.61 |
| 2013/0222369 A1* | 8/2013 | Huston | G06T 17/00 |
| | | | 345/419 |
| 2013/0241926 A1* | 9/2013 | Asaria | G06Q 10/00 |
| | | | 345/419 |
| 2013/0278600 A1* | 10/2013 | Christensen | G06T 15/50 |
| | | | 345/420 |
| 2014/0201039 A1* | 7/2014 | Harwell | G06Q 30/0643 |
| | | | 705/27.2 |
| 2015/0015581 A1* | 1/2015 | Lininger | G06T 11/00 |
| | | | 345/426 |

* cited by examiner

PROGRESSIVE ROTATIONAL VIEW

BACKGROUND

The present disclosure relates generally to receiving and displaying images in a progressive rotational view.

This section is intended to introduce the reader to various aspects of art that may be related to various aspects of the present disclosure, which are described and/or claimed below. The background information discussed herein should provide the reader with a better understanding of various aspects of the present disclosure. Accordingly, it should be understood that these statements are to be read in this light, and not as admissions of prior art.

In certain situations, it may be desirable to view depictions objects in detail for analysis. For example, a user of an electronic device may want to view electronic depictions of an object before purchasing the object. When viewing depictions of objects, often several perspectives of the object are desired to truly understand the appearance of the object that the user may want to fully appreciate before purchasing the object. Thus, the user may view the object in a 360° view. However, 360° views are often contained in a movie that requires the user to download at least a substantial portion of the movie before viewing the 360° view movie. Therefore, if the user is attempting to view the 360° movie of the object using a relatively slow internet connection (e.g., mobile device), the user is unable to view the movie for a substantial period of time.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to techniques for receiving and displaying images in a rotational view. By receiving and displaying images in both a gallery view and a rotational view, a user may view an object while waiting for enough images to be received to generate a rotational view. Furthermore, by reusing the images used in the gallery view in the rotational view, less bandwidth is used to receive the images since separate images and movies are not received. Less bandwidth consumption is desirable when a connection is relatively slow, a receiving electronic device is battery powered, and/or a connection is data limited (e.g., 2 GB/month). Furthermore, since the rotational view is constructed from multiple images, the rotation may be stopped on any image and viewed in full quality. In other words, each displayed perspective is available rather than intermediate frames that are generated using inbetweening. Thus, if a user wants to see an image, the user may manipulate the object to view such a perspective.

BRIEF DESCRIPTION OF THE DRAWINGS

Various aspects of this disclosure may be better understood upon reading the following detailed description and upon reference to the drawings in which.

DETAILED DESCRIPTION

Figure 1:
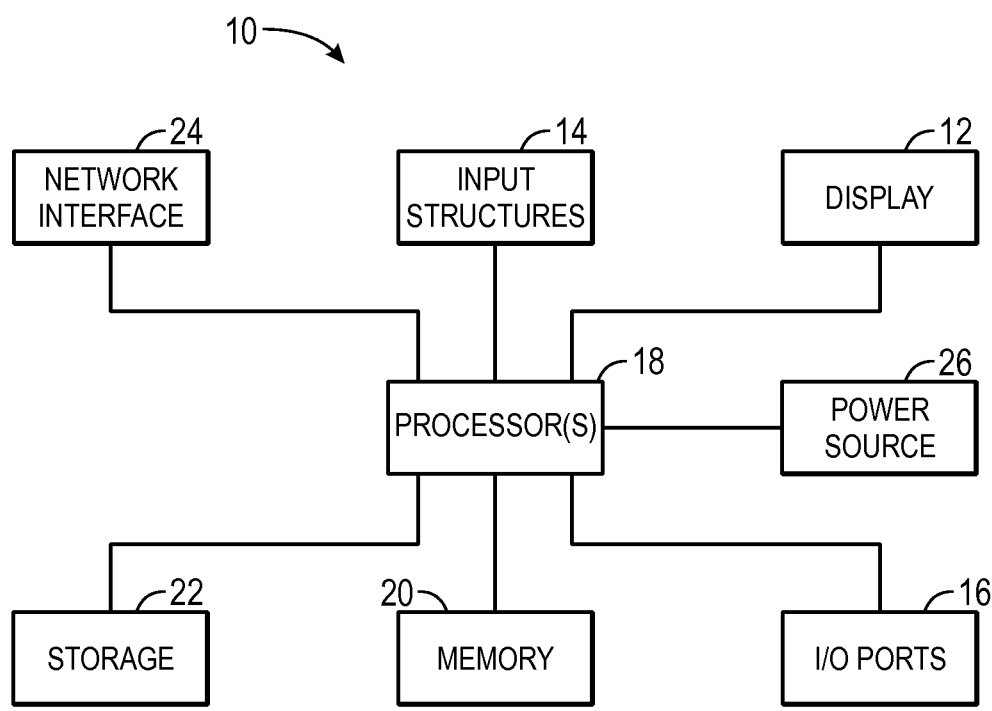
FIG. 1 is a block diagram of an electronic device that may use the techniques disclosed herein, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to techniques for receiving and display images in a rotational (e.g., 360° view). By receiving and displaying images in both a gallery view and a rotational view, a user may view an object while waiting for enough images (e.g., key images) to be received to generate a rotational view. As described herein, rotational or orbital views refer to a view of a depiction of an object that includes multiple perspectives of the object. For example, the rotational view may include a 360° view of the object in one or more planes. Additionally or alternatively, the rotational view may include less than a full rotation (e.g., 360°) around an object. For example, the rotational view may include a 90° view (e.g., front to side, side to top, bottom to side, etc.), a 180° view (e.g., top to bottom, side to side, front to back, etc.), or other portions of a rotation around an object less than 360°.

The key images may include perspectives of interest in which the user may be interested. Furthermore, by reusing key images in the gallery view in the rotational view, less bandwidth is used to receive the images since images and movies are not received. In addition, in some embodiments, the rotational view may be enhanced during viewing by receiving multiple passes of images that fill in details of the rotational view. Thus, by arranging subsequently received images between previously received images, the rotational view may improve as the viewer views the images by showing the images in an order different from the order in which the images were received.

Figure 2:
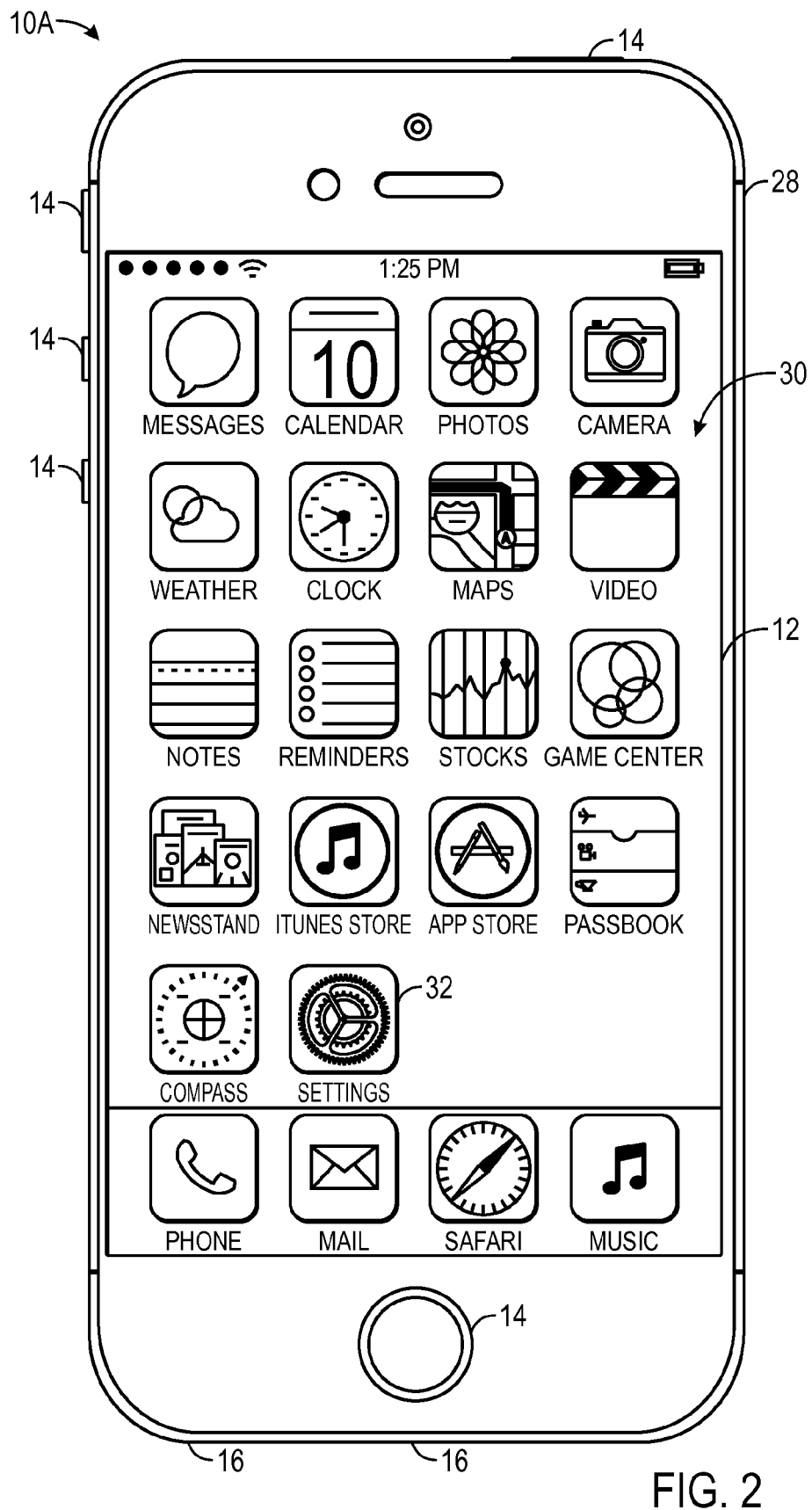
FIG. 2 is a front view of a handheld device, such as an iPhone® by Apple Inc., that may use the techniques disclosed herein, representing an example of the electronic device of FIG. 1, in accordance with an embodiment.
Figure 3:
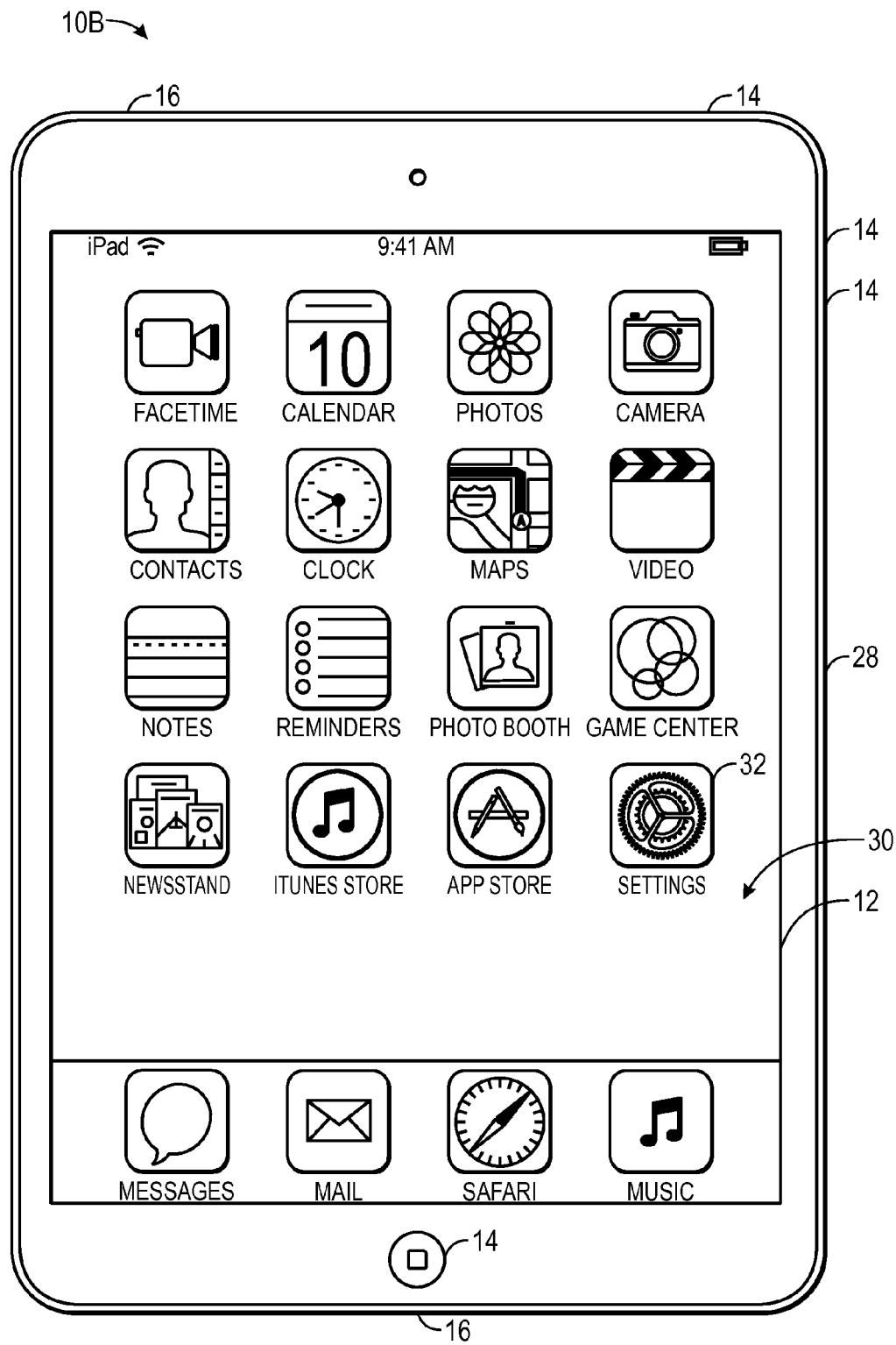
FIG. 3 is a front view of a tablet device, such as an iPad® by Apple Inc., that may use the techniques disclosed herein, representing an example of the electronic device of FIG. 1, in accordance with an embodiment.
Figure 4:
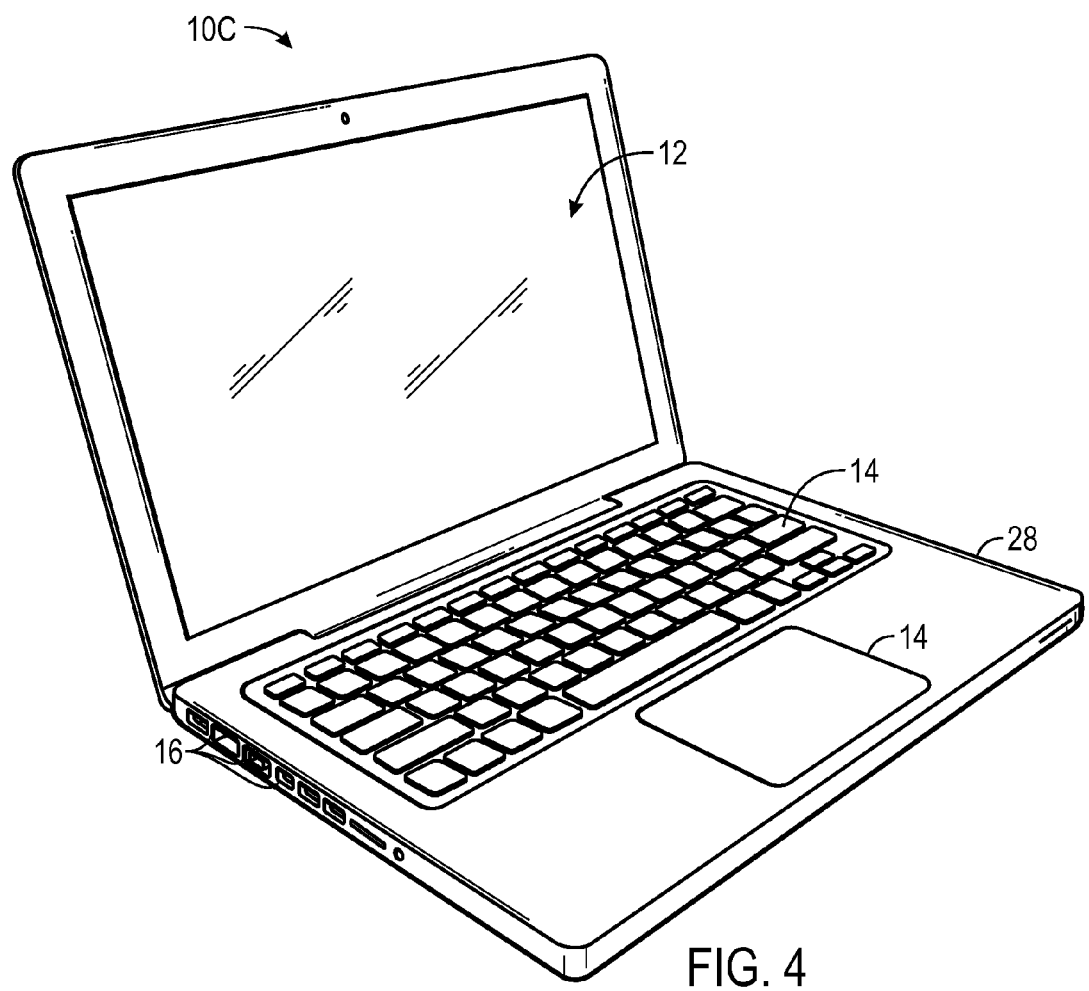
FIG. 4 is a perspective view of a notebook computer, such as a MacBook Pro® by Apple Inc., that may use the techniques disclosed herein, representing an example of the electronic device of FIG. 1, in accordance with an embodiment.

A variety of suitable electronic devices may employ the techniques described herein. FIG. 1, for example, is a block diagram depicting various components that may be present in a suitable electronic device 10. FIGS. 2, 3, and 4 illustrate example embodiments of the electronic device 10, depicting a handheld electronic device, a tablet computing device, and a notebook computer, respectively.

Turning first to FIG. 1, the electronic device 10 may include, among other things, a display 12, input structures 14, input/output (I/O) ports 16, one or more processor(s) 18, memory 20, nonvolatile storage 22, a network interface 24, and a power source 26. The various functional blocks shown in FIG. 1 may include hardware elements (including circuitry), software elements (including computer code stored on one or more tangible, non-transitory, computer-readable media) or a combination of both hardware and software elements. It should be noted that FIG. 1 is merely one example of a particular implementation and is intended to illustrate the types of components that may be present in the electronic device 10. Indeed, the various depicted components (e.g., the processor(s) 18) may be separate components (e.g., graphics processing unit, central processing unit, etc.), components of a single contained module (e.g., a system-on-a-chip device), or may be incorporated wholly or partially within any of the other elements within the electronic device 10. The components depicted in FIG. 1 may be embodied wholly or in part as machine-readable instructions (e.g., software or firmware), hardware, or any combination thereof.

By way of example, the electronic device 10 may represent a block diagram of the handheld device depicted in FIG. 2, the tablet computing device depicted in FIG. 3, the notebook computer depicted in FIG. 4, or similar devices, such as desktop computers, televisions, servers, and so forth. In the electronic device 10 of FIG. 1, the display 12 may be any suitable electronic display used to display image data (e.g., a liquid crystal display (LCD) or an organic light emitting diode (OLED) display). In some examples, the display 12 may represent one of the input structures 14, enabling users to interact with a user interface of the electronic device 10. In some embodiments, the electronic display 12 may be a MultiTouch™ display that can detect multiple touches at once. Other input structures 14 of the electronic device 10 may include buttons, keyboards, mice, trackpads, and the like. The I/O ports 16 may enable electronic device 10 to interface with various other electronic devices.

The processor(s) 18 and/or other data processing circuitry may execute instructions and/or operate on data stored in the memory 20 and/or nonvolatile storage 22. The memory 20 and the nonvolatile storage 22 may be any suitable articles of manufacture that include tangible, non-transitory, computer-readable media to store the instructions or data, such as random-access memory, read-only memory, rewritable flash memory, hard drives, and optical discs. By way of example, a computer program product containing the instructions may include an operating system (e.g., OS X® or iOS by Apple Inc.) or an application program (e.g., iBooks® by Apple Inc.).

The network interface 24 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The power source 26 of the electronic device 10 may be any suitable source of energy, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 28 to protect interior components from physical damage and to shield them from electromagnetic interference. The enclosure 28 may surround the display 12, which may display a graphical user interface (GUI) 30 having an array of icons 32. By way of example, one of the icons 32 may launch an application program (e.g., iBooks® by Apple Inc.). User input structures 14, in combination with the display 12, may allow a user to control the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Touchscreen features of the display 12 of the handheld device 10A may provide a simplified approach to controlling the application programs. The handheld device 10A may include I/O ports 16 that open through the enclosure 28. These I/O ports 16 may include, for example, an audio jack and/or a Lightning® port from Apple Inc. to connect to external devices. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a display 12, input structures 14, I/O ports 16, and a housing 28. In one embodiment, the input structures 14 (e.g., a keyboard and/or touchpad) may be used to interact with the computer 10C, such as to start, control, or operate a GUI or applications (e.g., iBooks® by Apple Inc.) running on the computer 10C. Furthermore, in some embodiments, the electronic device 10 may include server and/or cloud computing devices.

Figure 5:
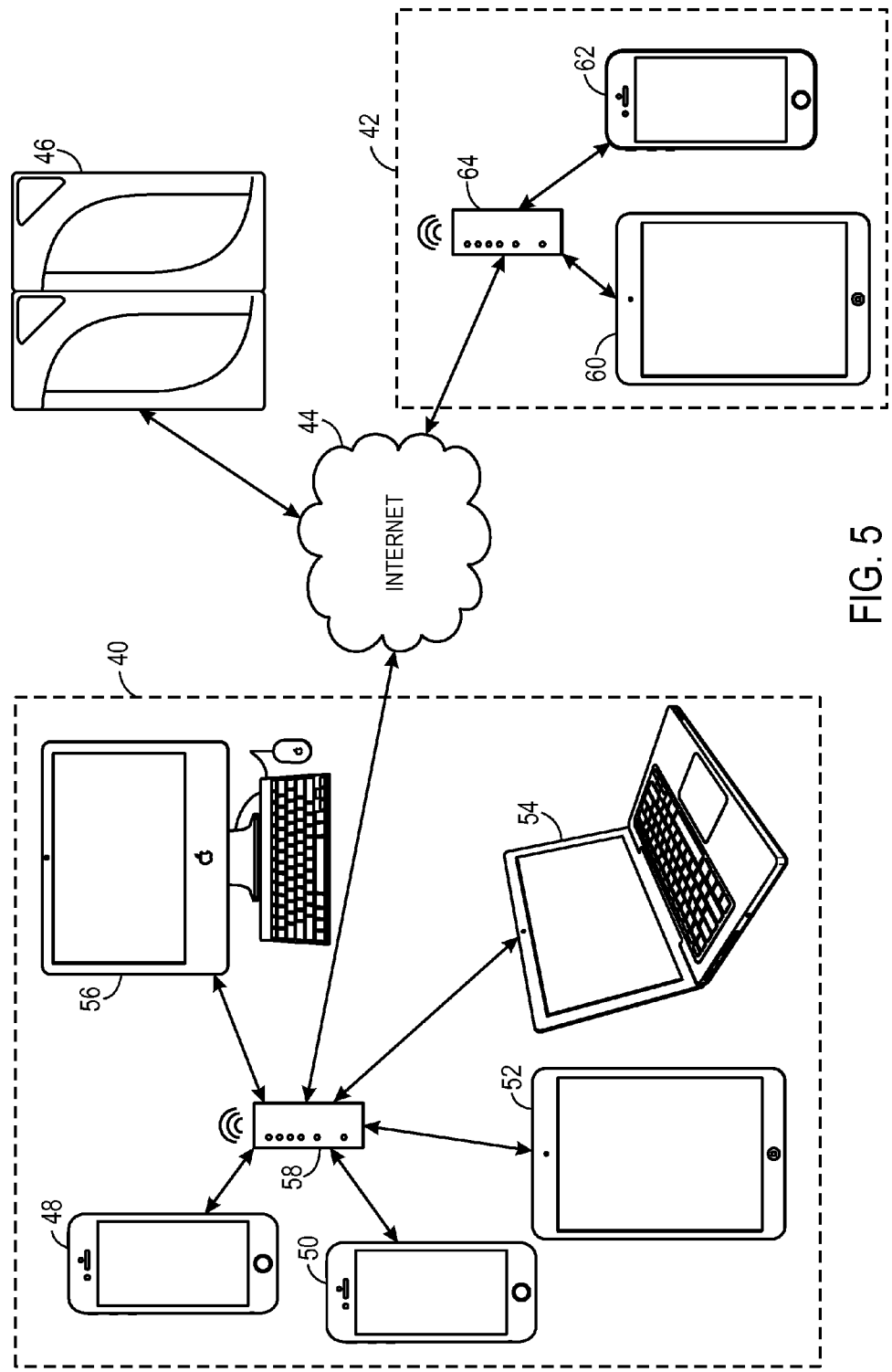
FIG. 5 illustrates an interconnection between electronic devices, such as the electronic devices of FIGS. 1-4, in accordance with an embodiment.

With the preceding in mind, FIG. 5 illustrates a block diagram view of an interconnection of various electronic devices 10. As illustrated, local networks, such as networks 40 and 42, may interconnect via the Internet 44 and/or other wide area networks. Additionally, the networks 40 and 42 may connect to one or more servers 46 through local networks and/or wide area networks (e.g., the Internet 44). The servers 46 may include one or more locally-connected or distributed computing devices, storage devices, and/or data warehouse appliances. Each of the networks includes one or more electronic devices 10. For example, the network 40 includes handheld devices 48 and 50, a tablet device 52, a notebook computer 54, and a desktop computer 56 each connected to the Internet 44 and each other via a router 58, and the network 42 includes a tablet device 60 and a handheld device 62 connected to each other and the Internet 44 via a router 64. Each of the devices in the networks 40, 42 may be connected to the router 58 or the router 64 using a wired (e.g., Ethernet) or wireless (e.g., WiFi) connection. Moreover, in some embodiments, a single network may include more than one router. In certain embodiments, one or more electronic devices may be connected directly to the Internet 44 without a router but directly connected with or without an external modem. Additionally, in some embodiments, one or more of the electronic devices 10 may directly connect to each other within a respective network. For example, the tablet device 52 may connect to the notebook computer 54 using a wired (e.g., USB) or wireless (e.g., Bluetooth or WiFi) connection.

Image Presentation

Figure 6:
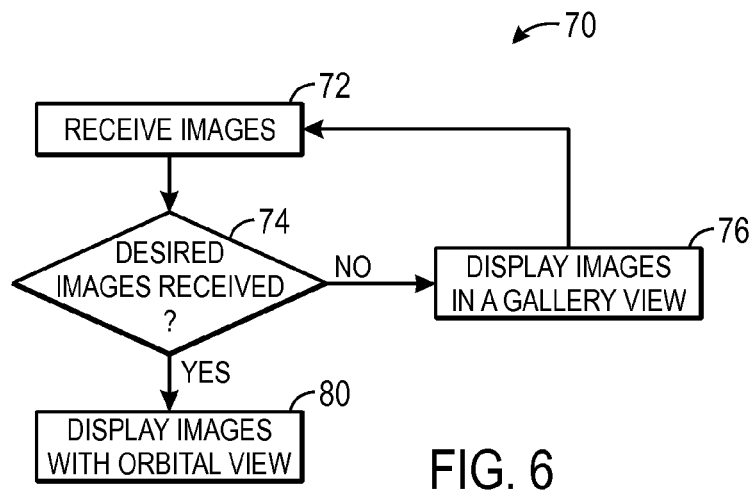
FIG. 6 illustrates a flow chart view of a process that may be executed by the electronic devices of FIGS. 1-4, in accordance with an embodiment.

Each of the electronic devices 10 may receive images from remote or local devices (e.g., the servers 46). These images may be used to present a rotational view of one or more objects. FIG. 6 illustrates a flow chart view of a process 70 that may be executed by a processor of the electronic device 10. The processor 18 receives images from another device, such as the servers 46 (block 72). The processor 18 determines whether desired images for a rotational view have been received (block 74). In some embodiments, the processor 18 may determine whether certain key images have been received. For example, the processor 18 may determine whether the desirable views (e.g., 0°, 90°, 180°, and 270°) of an object have been received. In another example, the image files may contain metadata indicating whether the images are key images. Additionally or alternative, other information (e.g., a list provided by the servers 46) may identify which images are key images. In another example, only the last key image may be identified as such by any suitable technique (e.g., metadata associated with the image).

Additionally or alternatively, the processor 18 may determine whether the transition between images in the rotational view will be substantially smooth. For example, the processor 18 may determine that a difference in viewing angles between adjacent images does not exceed a desired value (e.g., 45°). To enable such analysis, in some embodiments, each image may include metadata that identifies a view represented in the image. For example, a tag may be added in the image file or may be included in the name of the image when the image file is cached in the storage 22. In certain embodiments, the processor 18 may determine if a threshold number of total images have been received. For example, the processor 18 may determine that the desired images are received when more than eight images have been received.

In some embodiments, one or more of the desired characteristics—key images, angular distance between views, and minimum number of images—may be all determined to determine whether the desired images are received. In some embodiments, the processor 18 may deem that the desired images are received once each desired characteristic has been achieved. In other words, in such embodiments, each of the characteristics may be considered as a separate item in a checklist that the processor 18 uses to determine whether desired images have been received. In other embodiments, the processor 18 may determine that the desired images have been received if any of the desired characteristics have been satisfied. For example, in such embodiments, the processor 18 may determine that the desired images are received when a minimum threshold of images have been received even if no key images and/or angular distances have been identified or the key images and/or the angular distances characteristics have not yet been achieved.

When the processor 18 determines that the desired images have not yet been received, the processor 18 causes the images to be displayed by the display 12 in a gallery view (block 76). As will be discussed below, the presented gallery view includes separate images that may be displayed separately. When the processor 18 determines that the desired images have been received, the processor 18 causes the images to be displayed by the display 12 in a rotational view (block 80). As will be discussed below, the rotational view includes weaving the images together to form a continuous or pseudo-continuous view that presents views from around one or more target objects. In some embodiments, the rotational view may include at least some portion of an orbit or rotation around one or more target objects in a single plane. For example, such a view would include images along a circular path of travel around the one or more objects. In certain embodiments, the rotational view may include more than a single plane. For example, when top and bottom views are desired alongside front, back, and side views, a plane that encompasses the front, back, and side views may be incorporated along with a plane that encompasses the front, back, top, and bottom views. In some embodiments, the rotational view may include 1, 2, 3, 4, 5, or more planes of perspective. Indeed, as the number of planes increases, the more closely the rotational view appears to be a complete three-dimensional 360° view of the one or more objects.

Figure 7:
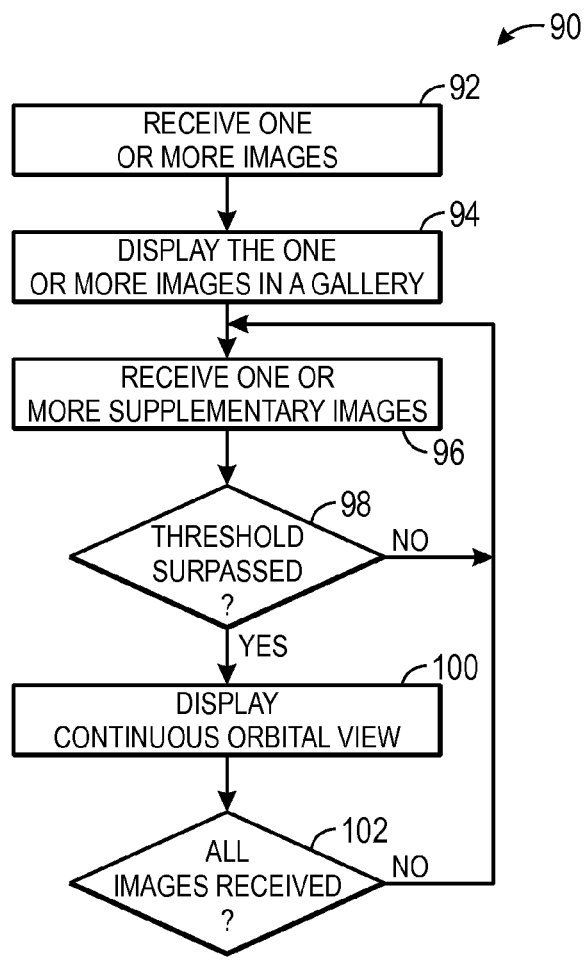
FIG. 7 illustrates a flow chart view of a process to receive supplementary images during a presentation of a gallery view that may be executed by the electronic devices of FIGS. 1-4, in accordance with an embodiment.

FIG. 7 illustrates a process 90 that may be employed by the processor 18 in using key images to determine whether desired images have been received. In certain embodiments where one or more images are considered key images, the key images may be sent by the servers 46 and received by the electronic device 10 prior to receiving lower priority images. As will be discussed below, the key images may include images depicting keystone perspectives, such as top, front, back, right, left, and/or bottom views. In some embodiments, the key images may include images that are equally spaced around the one or more target objects. In other embodiments, the key images may be from perspectives that are not equally spaced. For example, in certain embodiments, the key images may include perspectives more closely spaced near the front of an object being displayed and more remotely spaced near the rear of the object being displayed. Additionally or alternatively, the key images may include perspectives more closely spaced near features of interest (e.g., logos, emblems, seams, etc.) that a designer, inventor, or presenter of an object may want to present to a user.

Returning to FIG. 7, the electronic device 10 receives one or more images (block 92). The one or more images may include at least one key image. The processor 18 causes the display 12 to display the one or more images in a gallery view (block 94). In some embodiments, the processor 18 displays only a subset of the one or more received images. For example, in such embodiments, only the highest priority key images may be displayed. Such prioritization of images may be helpful in limiting a number of gallery view images presented to a desired number even if a rotational view is not ready to be presented. After the one or more images are received, the processor 18 receives one or more supplementary images (block 96). The supplementary images may include images that show perspective views between the perspectives presented in the one or more images. In other words, the supplementary images may fill in gaps between images. In some embodiments, gaps between perspectives in key images may be divided (e.g., in half, in thirds, etc.) by supplemental images in a first pass of infilling. In certain embodiments, gaps remaining between images from a first pass of infilling may be further filled in using subsequent passes. For example, if key images show 90° and 180° perspective view, a first pass of supplemental images may include a 45° view. After receiving one or more supplementary images, the processor 18 determines whether a threshold has been surpassed for desired images (block 98). For example, the processor 18 may determine whether gaps between images are below an angular distance threshold and/or whether the processor 18 has received more than a threshold number of images.

If the processor 18 determines that the threshold has not been surpassed, the processor 18 continues to show the one or more images in the gallery view and receives additional supplementary images until the threshold has been surpassed. In some embodiments, the gallery view may include supplementary images as they are received by the processor 18. In other embodiments, only the originally received one or more images are displayed in the gallery view. Once the processor 18 determines that the threshold has been surpassed, the processor 18 causes the display 12 to display the one or more images and the supplementary images in a continuous rotational view (block 100). As previously discussed, the rotational view may transition between the still images to provide a pseudo-continuous 360 rotational view of the one or more objects being viewed, such that the one or more objects appear to be rotating on the display 12. In some embodiments, the continuous rotational view may include a static image present on the display 12 until an indication of rotation is received via the input structures 14 of the electronic device 10. In some embodiments, the processor 18 may continue to receive images while presenting the continuous rotational view. Thus, in certain embodiments, the processor 18 may determine whether all images have been received (block 102). If not all images have been received, the processor 18 continues to receive supplementary images even while presenting previously received images in the continuous rotational view. Thus, the additional supplementary images may be used to increase the amount of views used to present the continuous rotational view thereby causing the apparent rotation of the one or more objects to become more realistic in appearance.

Figure 8:
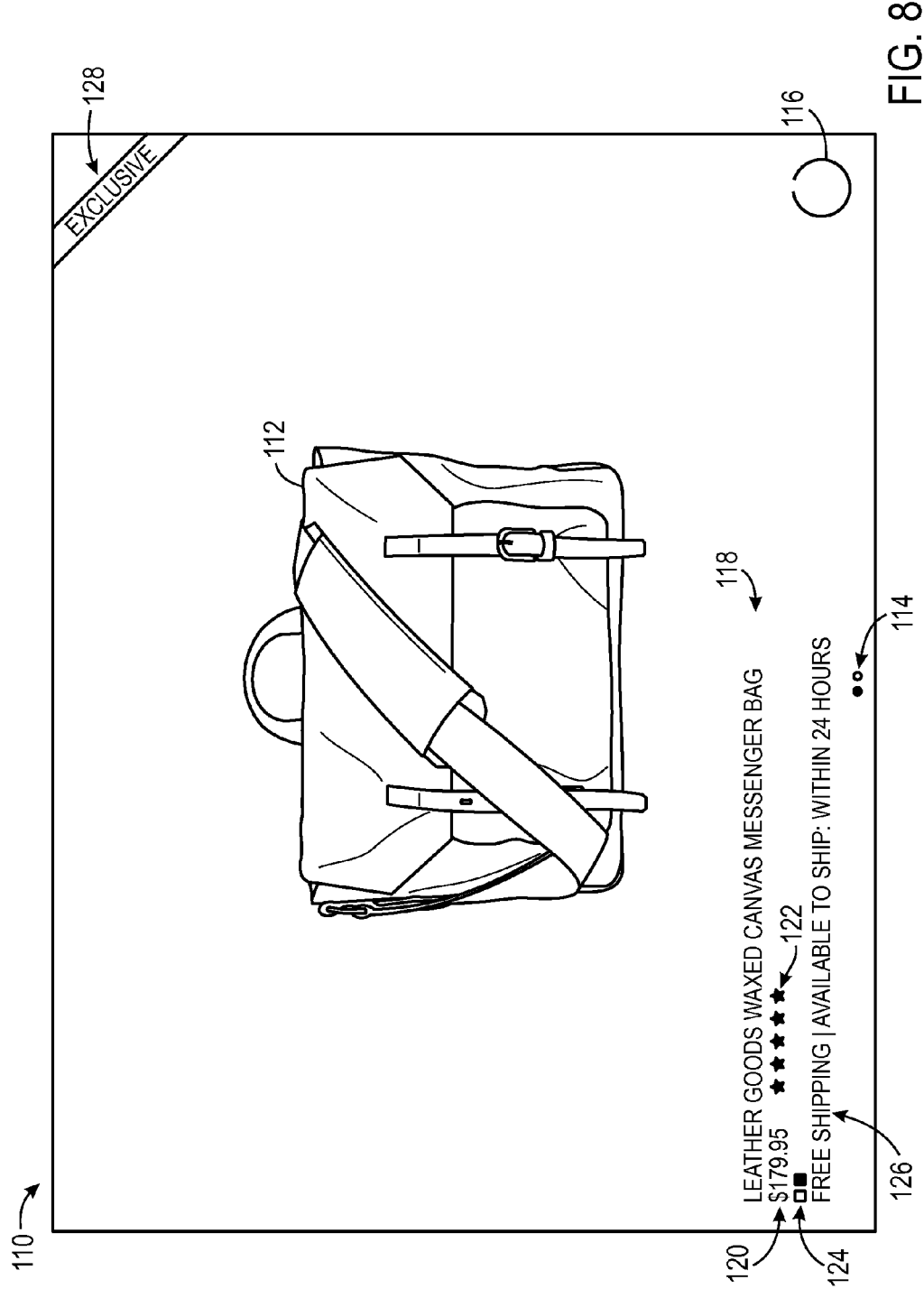
FIG. 8 illustrates a gallery view of a first image showing a first view that may be displayed in accordance with the processes of FIGS. 6 and 7, in accordance with an embodiment.

FIG. 8 illustrates an embodiment of a gallery screen 110 used to display images of one or more objects in a gallery view, such as an object 112, in accordance with an embodiment. As the processor 18 receives images of the object 112, the processor 18 causes the display 12 to display the screen 110 in a gallery view. In some embodiments, the gallery screen 110 may include an image indicator 114 that indicates that an image from a gallery is being viewed. The illustrated embodiment of the image indicator 114 includes open and closed circles. In other embodiments, the gallery screen 110 may include other indicators such as number of images, buttons having non-circular shapes, text, or other indicators suitable for indicating that a number of images are available and enabling the user to select one of the images either directly or indirectly. Furthermore, in certain embodiments, the indicator 114 may include information informing the user as to which image is currently being viewed. For example, in the illustrated embodiment, a closed circle indicates that the first of two images is being viewed. In other embodiments, a respective portion of the indicator 114 may be underlined, highlighted, bolded, or otherwise emphasized in a manner that informs a user that the first image is being viewed.

The indicator 114 may also inform the user that the images are currently being displayed in a gallery view. In other words, when multiple images are indicated as viewable in the indicator 114, the indicator 114 informs the user that the user may navigate between the images in the gallery view. Additionally or alternatively, the gallery screen 110 may include a status indicator 116 that indicates whether images are currently being received and/or whether a gallery view or rotational view is being currently provided. For example, in the illustrated embodiment, the status indicator 116 includes a broken circle that rotates around to inform a user that images are currently being received and that images are currently being preserved in a gallery view. In some embodiments, the status indicator 116 may enable a user to initiate a rotational view process by receiving images for the rotational view. In other embodiments, the rotational view process may be automatically initiated upon viewing content having the image (e.g., a webpage).

In some embodiments, the gallery screen 110 may include additional information, such as object information 118 that provides additional information about the object 112. The object information 118 may include a title for the object, manufacturer, materials, and/or other information about the object 112. When the gallery screen 110 is part of a store, such as the Apple Store®, provided by Apple, Inc., the gallery screen 110 may also include cost information 120, review ratings 122, available colors information 124, and/or shipping information 126. The gallery screen 110 may also include supplemental information 128 detailing any special information that may be helpful to the user viewing the object 112. For example, the supplemental information 128 may inform a user that the object 112 is exclusively sold by an organization providing the gallery screen 110.

Figure 9:
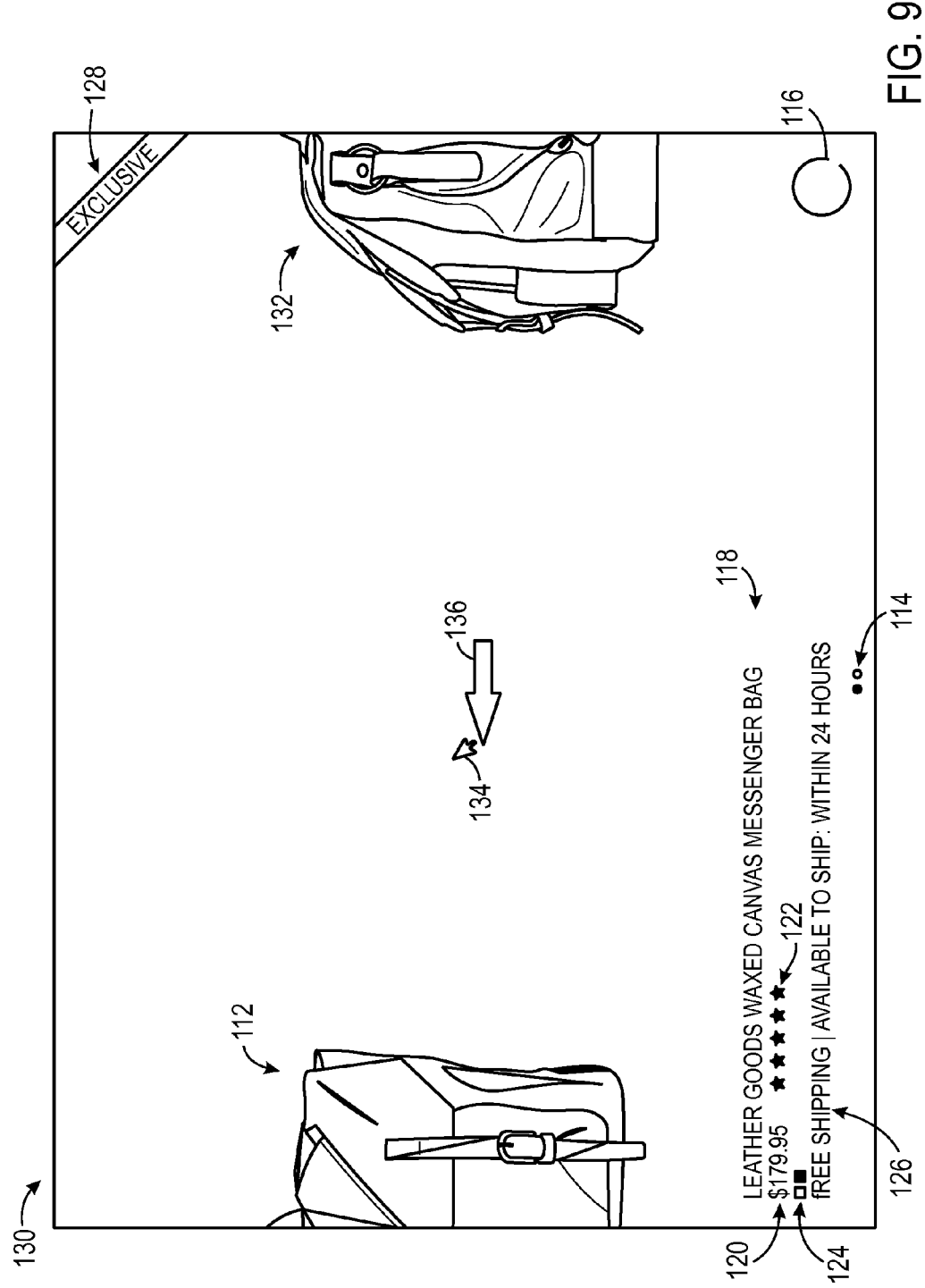
FIG. 9 illustrates a gallery view of the first image of FIG. 8 and a second image showing a second view, in accordance with an embodiment.

FIG. 9 illustrates a gallery screen 130 that illustrates a transition between images. In the gallery screen 130 when a user initiates a change from a first image of the object 112 showing a first perspective to a second image 132 of the object showing a second perspective of the object 112. In some embodiments, when the electronic device 10 is presenting a gallery view, the processor 18 may cause the display to transition between the images. For example, the gallery screen 130 includes a slide transition between the first image of the object 112 and the second image 132 by sliding the first image out of frame to the left and sliding the second image 132 into frame from the right. In some embodiments, the slide transition may be in response to an input from a user via the input structures 14. For example, if the user initiates a click and drag with the cursor 134 from right to left as indicated by the movement 136, the processor 18 may drag the image of the object 112 to the left with the movement 136. Once the movement 136 has gone a certain distance, the processor 18 may cause the slide transition to occur. In some embodiments, if the movement 136 is in the opposite direction, the slide transition direction may be reversed (e.g., left to right). Thus, the user may scroll through images using the input structures. In some embodiments, the images may be looped such that a left scroll from the first image results in the display of the last image and vice versa.

Additionally or alternatively, transitioning between images may be initiated using other inputs. For example, the slide transition may be initiated by the processor 18 when the input devices 14 receive a key input (e.g., left or right arrows, a number corresponding to the desired image), a gesture (e.g., a swipe gesture), voice commands, a mouse drag, a selection of a respective image via the indicator 114, and/or other inputs that a user may use to navigate between images.

Furthermore, the processor 18 may use other transitions between images in addition or in place of the slide transition. For example, the processor 18 may cross-fade between images, fade through animations, rotations, and/or the like. In some embodiments, the transitions may vary by the type of input received. For example, when the images are swiped, a slide transition may be used to navigate between images. However, when the indicator 114 is used to select an image, a cross-fade may be used to transition between the previous image and the current image.

Figure 10:
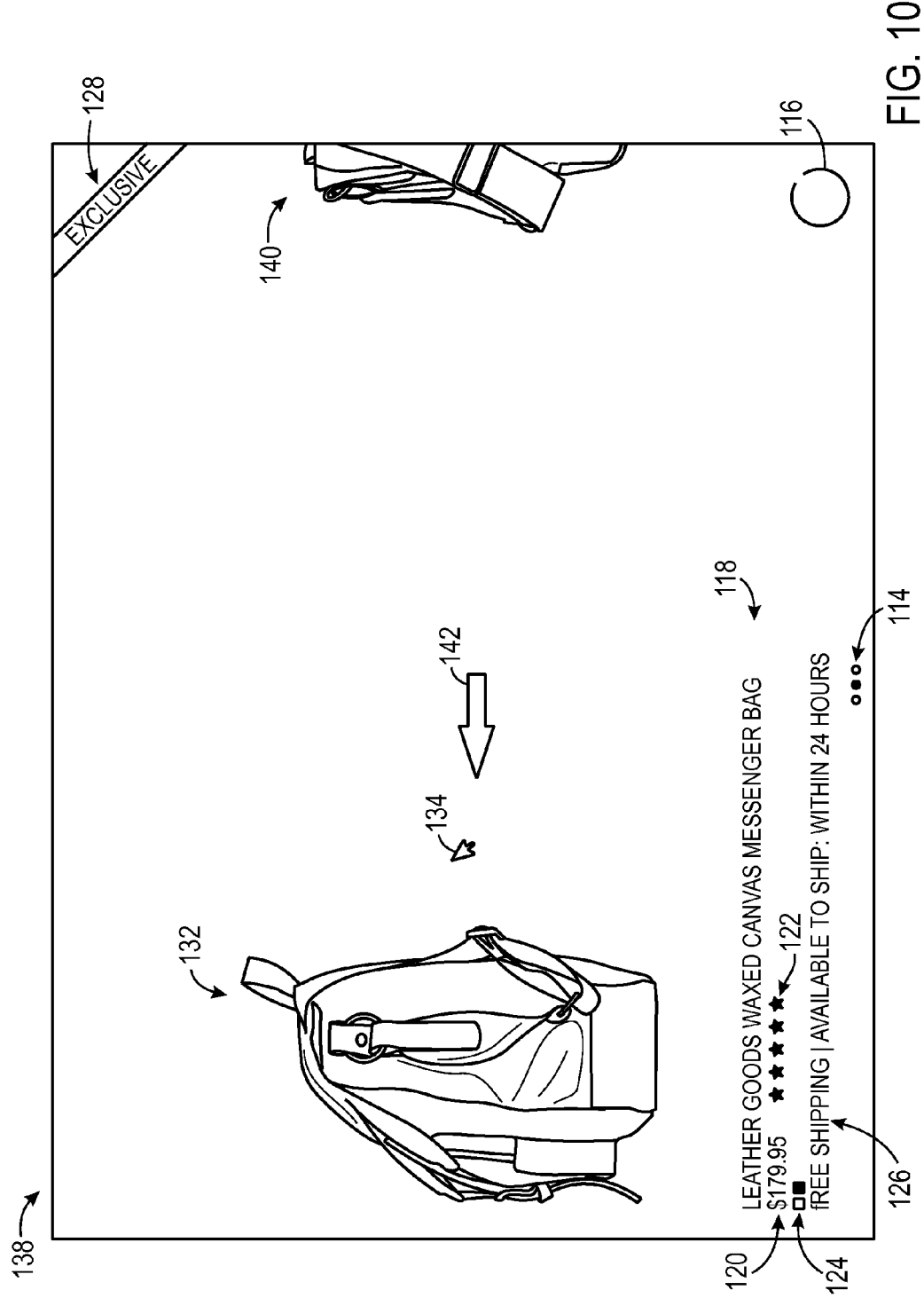
FIG. 10 illustrates a gallery view of the second image of FIG. 9 and a third image showing a third view, in accordance with an embodiment.

FIG. 10 illustrates a gallery screen 138 of the object 112 transitioning from the second image 132 to a third image 140 in response to movement 142 of the cursor 134. Similar to the transition between the first image and the second image 132, the third image may be navigated to by a swiping movement 142 of the cursor 134. Furthermore, when the third image 140 is received, the indicator 114 may reflect that three images are available to view. Furthermore, since the transition has not occurred from the second image 132 to the third image 140, the indicator 114 indicates that the second image 132 is being viewed by showing a closed circle for the second of the three circles with the other two circles being open circles.

Figure 11:
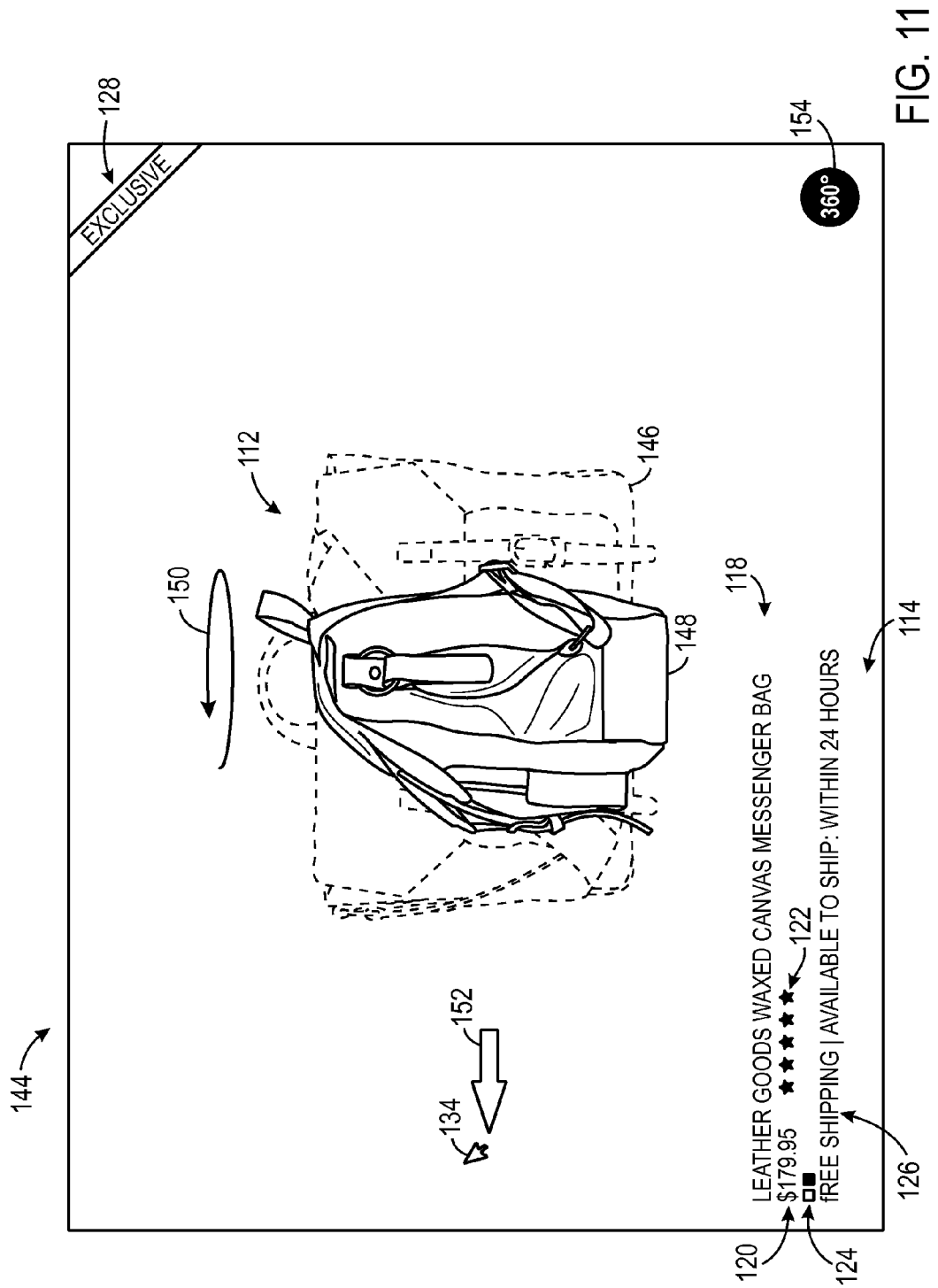
FIG. 11 illustrates a rotational view that may be displayed in accordance with the processes of FIGS. 6 and 7, in accordance with an embodiment.

FIG. 11 illustrates a rotational screen 144 that displays a pseudo-continuous rotational view of the object 112. In some embodiments, the rotational view may be caused by fading from a first perspective 146 to a second perspective 148 of the object. Since the images progressively reflect different perspectives around the object 112, fading between consecutive objects will cause the object 112 to appear as if the object were rotating in the rotational direction 150. In some embodiments, the pseudo-rotation of the object 112 may be initiated by the user moving the cursor 134 in the direction 152 and/or other suitable inputs, such as swipe gestures, key presses, and the like. Thus, in certain embodiments, an input used in the gallery view may result in a different transition between images than the transition that results from the same input in the rotational screen 144. In some embodiments, the status indicator 154 may inform the user which type of view is currently being deployed. Thus, the user may know which type of transition or display may occur before initiation a change in views of the object 112. In some embodiments, the user may select the status indicator 154 when the rotational view is indicated that enables the user to initiate the pseudo-rotation of the object 112. In some embodiments, the status indicator 154 may indicate that additional images are being received even after the rotational view is deployed. For example, the status indicator 154 may include a ring around the status indicator 154 that rotates until all images are received. In other embodiments, the status indicator 154 may omit such image receiving notifications.

In some embodiments, the status indicator 154 may be omitted completely. For example, when the image indicator 114 is included, the gallery view is being presented, but when the image indicator 114 is not being shown, the rotational view is presented. In some embodiments, if the user does not initiate a rotation after the appropriate images have been loaded. The rotational view may be automatically initiated (e.g., a single rotation with or without smoothing transitions) to visually notify the user that the rotational view is available. In some embodiments, such automatic rotation may be deployed alongside the status indicator 154 as a more striking notification of rotational view availability. In other embodiments, the automatic rotation may be used to replace the status indicator 154 or in situations where the status indicator 154 is omitted entirely.

Image Order

Figure 12:
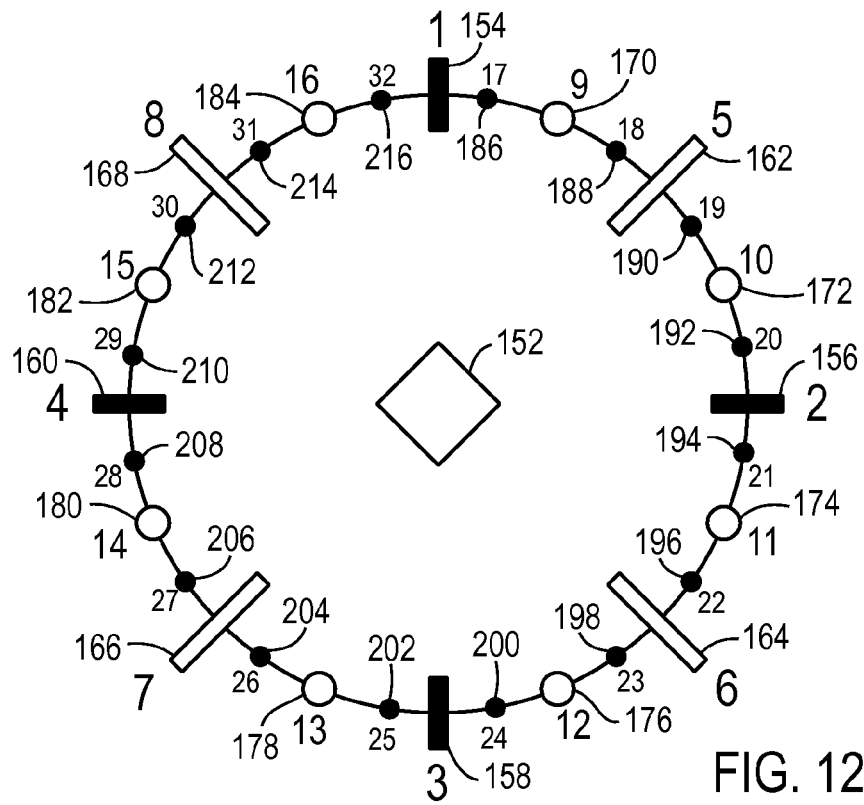
FIG. 12 illustrates an image view progression that may be deployed in accordance with the processes of FIGS. 6 and 7.

In some embodiments, the images may be received in an order in which the images will be displayed. As previously discussed, key images may be received before supplemental images. FIG. 12 illustrates an image order that reflects progressive scans around an object 152 using views that angularly distributed in each scan around the object. In such an embodiment, the key images may include perspectives that are equally distant from each other around an azimuth of the object 152. For example, when there are four key images, as illustrated, the key images 154, 156, 158, and 160 correspond to views of the object 152 at 0°, 90°, 180°, and 270° around the object 152. However, if five key images are to be included, those images may spaced 72° apart. Thus, regardless of the number of key images, the key images may be equally distributed on an azimuth of the object 152.

As previously discussed, these images may be used for a gallery view of the object. In a second pass, each of the gaps between the perspectives of the images may be bisected by a perspective of a new image. For example, a gap of 90° between images after a first scan may be bisected by images reflecting 45° angles between the perspectives of the key images. In the illustrated embodiment, the second scan of images around the object 152 includes images 162, 164, 166, and 168 respectively corresponding to perspective views of 45°, 135°, 225°, and 315°. Similarly, in the third scan, the gaps left between perspectives by the second scan may be bisected by new perspectives. For example, images 170, 172, 174, 176, 178, 180, 182, and 184 may distributed at the gaps left by the second scan. After the second scan, images are located at 45° degree intervals around the object 152. When the third scan bisects these gaps, images may then be located at each 22.5° interval around the object 152. Thus, images 170, 172, 174, 176, 178, 180, 182, and 184 may correspond to perspectives from angles 22.5°, 67.5°, 112.5°, 157.5°, 202.5°, 247.5°, 292.5°, and 337.5°, respectively. Similarly, a fourth pass may correspond to images at each 11.25° that have not already been received.

The angular distance between images in each pass may be determined using the following equation:

$$\theta_{pass} = \frac{360}{n * p}, \quad \text{(Equation 1)}$$

where $\theta_{pass}$ denotes the angular distance left between image perspectives after each pass, n is the number of images in a first pass, and p is the number for the passes performed. Within each pass, an angle corresponding to each image in each pass may be determined using the following equation:

$$\theta_{image} = \theta_{pass} * (i - 1) \quad \text{(Equation 2)}$$

where $\theta_{image}$ is angle of the perspective for the image in a pass and i corresponds to which number the image in the sequence of the pass. For example, using the foregoing equations, if three images are included in an initial pass, the third pass results in gaps of 30° between images. Furthermore, the third image in the third pass corresponds to 60°.

Figure 13:
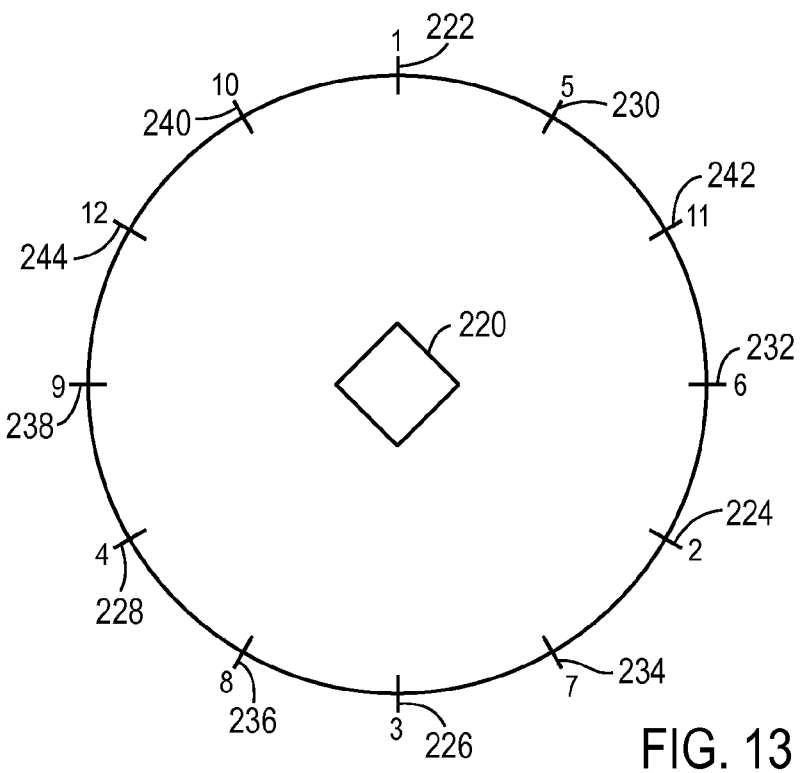
FIG. 13 illustrates an another image view progression that may be deployed in accordance with the processes of FIGS. 6 and 7, in accordance with an embodiment.

In other embodiments, the images of each pass may not be equally distributed. For instance, the key images may be more closely spaced near a front perspective of the image. For example, FIG. 13 illustrates an image order where a first pass includes images more closely spaced near a front of an object 220. In the illustrated embodiment, a first pass of images includes images 222, 224, 226, and 228, which are more closely spaced near a front of the object 220. Subsequent passes may then fill gaps. For example, a second pass may include images 230, 232, 234, 236, 238, and 240. In some embodiments, additional passes may be used to fill in additional gaps. In the illustrated embodiment, a third pass includes images 242 and 244. Further passes may be used to include additional gaps, if desired. Other orders of image transmission may be used based on a desired appearance of content (e.g., web-page) that includes the one or more objects being displayed.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A tangible, non-transitory, computer-readable medium storing instructions that, when executed by a processor, are configured to cause the processor to:
   receive a first plurality of key images of an object, wherein each key image includes a perspective view of the object, each key image having a corresponding and different capture angle from around the object;
   cause a display of a subset of the first plurality of key images in a gallery view, wherein the subset comprises a second plurality of highest priority key images selected from the first plurality of key images;
   receive a third plurality of supplementary images, wherein each supplementary image includes a perspective view of the object, each supplementary image having a corresponding capture angle that is between two adjacent capture angles of the first plurality of key images;
   determine, during reception of the third plurality of supplementary images, that a total number of received images is greater than a threshold number of images or that a gap between adjacent images is less than a gap threshold; and
   blend, based on the determination, the first plurality of key images and the received images of the third plurality of supplementary images to display a rotational view of the object, wherein the remainder of the third plurality of supplementary images are added to the rotational view as they are received.

2. The tangible, non-transitory, computer-readable medium of claim 1, wherein the instructions are further configured to cause the processor to receive a fourth plurality of supplementary images, wherein each image of the fourth plurality of supplementary images includes a perspective view of the object from a capture angle between an image of the third plurality of supplementary images and an adjacent image of the first plurality of key images.

3. The tangible, non-transitory, computer-readable medium of claim 1, wherein the instructions are further configured to cause the processor to receive a fourth plurality of supplementary images, wherein each image of the fourth plurality of supplementary images includes a perspective view of the object from a capture angle between images of the third plurality of supplementary images.

4. The tangible, non-transitory, computer-readable medium of claim 1, wherein the first plurality of key images have capture angles that are equally spaced around the object.

5. The tangible, non-transitory, computer-readable medium of claim 1, wherein the first plurality of key images have capture angles that are spaced more closely near a first portion of the object and more remotely near a second portion of the object.

6. The tangible, non-transitory, computer-readable medium of claim 5, wherein the first portion corresponds to a feature of interest of the object.

7. The tangible non-transitory, computer-readable medium of claim 5, wherein the first portion corresponds to a front of the object.

8. An electronic device comprising:
   a network interface;
   a display;
   a processor configured to execute instructions;
   one or more tangible, non-transitory, computer-readable media configured to store the instructions, wherein the instructions, when executed, are configured to cause the processor to:
   receive, via the network interface, a first plurality of images wherein each image shows a different perspective of an object;
   display, via the display, a subset of the first plurality of images in a gallery view, wherein the gallery view enables the user to scroll between the subset of the first plurality of images, wherein the subset comprises a second plurality of highest priority key images selected from the first plurality of images;
   receive, via the network interface, a third plurality of supplemental images;

determine, during reception of the third plurality of supplemental images, that a total number of received images is greater than a threshold number of images or that a gap between adjacent images is less than a gap threshold; and display, based on the determination, the first plurality of images and the received images of the third plurality of supplemental images in a rotational view, via the display, wherein the remainder of the third plurality of supplemental images are added to the rotational view as they are received.

9. The electronic device of claim 8, comprising input structures configured to receive a first input that causes the processor to scroll through the second plurality of images in the gallery view and to receive a second input that causes the processor to initiate a rotation in the rotational view.

10. The electronic device of claim 9, wherein the first and second inputs each comprise a mouse drag, a gesture, a key input, or a direct selection of an image.

11. The electronic device of claim 10, wherein the first and second inputs comprise a same type of input.

12. The electronic device of claim 8, wherein the instructions are configured to cause the processor to cause the display of the second plurality of images in the gallery view until the threshold number of images have been received, at which point the processor causes the display of the first plurality of images and the third plurality of supplemental images in the rotational view; wherein the threshold number of images is equal to or less than the sum of the first plurality of images and the third plurality of images.

13. The electronic device of claim 8, wherein the instructions are configured to cause the processor to cause the display of the second plurality of images in the gallery view until gaps between perspectives in the first plurality of images and the third plurality of supplemental images are less than a gap threshold, at which point the processor causes the display of the first plurality of images and the third plurality of supplemental images in the rotational view.

14. The electronic device of claim 13, wherein the instructions are configured to cause the processor to determine gaps between image perspectives based at least upon metadata in received image files.

15. The electronic device of claim 13, wherein the instructions are configured to cause the processor to determine gaps between image perspectives based at least in part by bisecting the gaps between the image perspectives.

16. The electronic device of claim 8 comprising instructions configured to cause the processor to receive instructions from a remote electronic device configured to cause the processor to sort and to display the received first plurality of images and the received third plurality of supplemental images in the rotational view.

17. An electronic device comprising:
a network interface;
a processor; and
one or more tangible, non-transitory, computer-readable media storing instructions that, when executed by a processor, are configured to cause the processor to:
send, via the network interface, a first plurality of key images, wherein each key image includes a perspective view of an object, each key image having a corresponding and different capture angle from around the object, wherein a subset of the first plurality of key images are configured to be presented in a gallery view by a remote device, wherein the subset comprises a second plurality of highest priority key images selected from the first plurality of key images; and
send a third plurality of supplemental images configured to be combined with the first plurality of key images in a rotational view, wherein the third plurality of supplemental images are configured to be displayed in a rotational view based on a determination during reception of the third plurality of supplemental images that a total number of received images is greater than a threshold number of images or that a gap between adjacent images is less than a gap threshold, wherein the remainder of the third plurality of supplemental images are added to the rotational view as they are received.

18. The electronic device of claim 17, wherein the instructions are configured to cause the processor to include metadata in a file for each of the first plurality of key images and the third plurality of supplemental images identifying an angle of perspective of the image stored in the file.

19. The electronic device of claim 18, wherein the first plurality of key images and the third plurality of supplemental images are included in a webpage.

20. A method for presenting images comprising:
sending instructions from a server to a remote device, wherein the instructions are configured to cause the remote device to:
receive a first plurality of images;
display a subset of at least one of the first plurality of images in a gallery view before a threshold has been surpassed, wherein the subset comprises a second plurality of highest priority key images selected from the first plurality of key images;
receive a third plurality of supplementary images;
determine, during reception of the third plurality of supplementary images, that a total number of received images is greater than a threshold number of images or that a gap between adjacent images is less than a gap threshold; and
blend, based on the determination, the first plurality of key images and the received images of the third plurality of supplementary images to display a rotational view of an object, wherein the remainder of the third plurality of supplementary images are added to the rotational view as they are received.

21. The method of claim 20, wherein a transition to the rotational view is based on a threshold that comprises a number of images, an angular distance between image perspectives, or a number of key images.

22. A method of displaying images comprising:
receiving a first plurality of key images in a first order;
displaying a subset of the first plurality of key images in a gallery view, wherein the subset comprises a second plurality of highest priority key images selected from the first plurality of key images;
receiving a second plurality of supplemental images in a second order;
determine, during reception of the second plurality of supplemental images, that a total number of received images is greater than a threshold number of images or that a gap between adjacent images is less than a gap threshold; and
blend, based on the determination, the first plurality of key images and the received images of the second plurality of supplemental images to display a rotational view of an object, wherein the remainder of the second plurality of supplemental images are added to the rotational view as they are received; and
mixing the first plurality of key images with the second plurality of supplemental images in the rotational view, wherein the rotational view does not display the first plurality of key images in the first order or the second plurality of supplemental images in the second order received.

23. The method of claim 22, wherein receiving the first plurality of key images and the second plurality of supplemental images comprises receiving website content.

\* \* \* \* \*